(No Model.)
S. R. FORBESS.
BELT TIGHTENER.
No. 593,090. Patented Nov. 2, 1897.
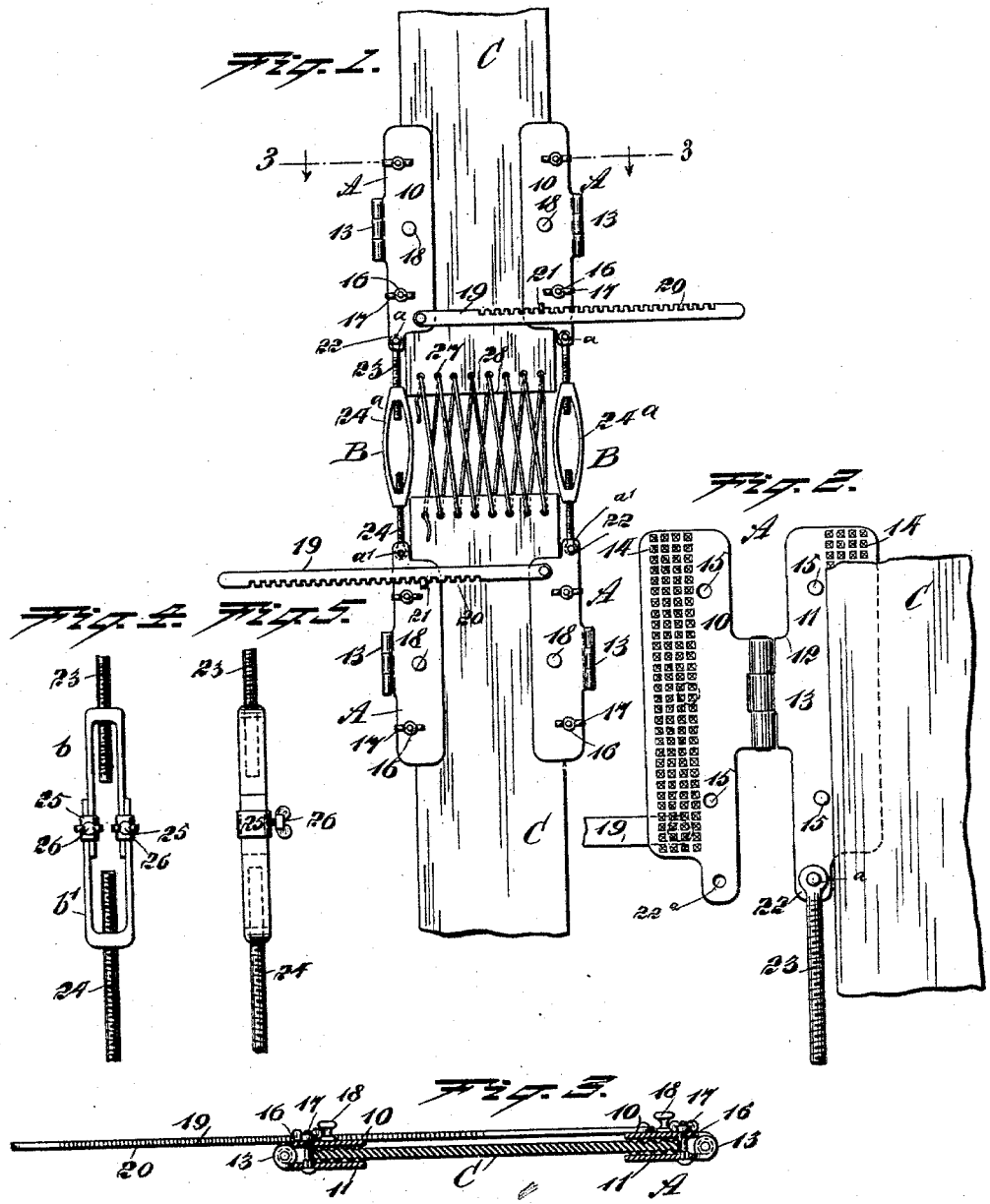
WITNESSES:
Henry T. Hirsch.
INVENTOR
S. R. Forbess
BY
ATTORNEYS.

UNITED STATES PATENT OFFICE.

SOLOMON R. FORBESS, OF RANDOLPH, TENNESSEE.

BELT-TIGHTENER.

SPECIFICATION forming part of Letters Patent No. 593,090, dated November 2, 1897.

Application filed January 7, 1897. Serial No. 618,224. (No model.)

*To all whom it may concern:*

Be it known that I, SOLOMON R. FORBESS, of Randolph, in the county of Tipton and State of Tennessee, have invented a new and Improved Belt-Tightener, of which the following is a full, clear, and exact description.

The object of my invention is to construct a belt-clamp that may be used upon a narrow or upon a wide belt with equal facility and upon a belt when located close to a wall.

A further object of the invention is to provide a belt-clamp which will not place the belt in detrimental strain and which may be used for the purpose of lacing the belt while the belt is upon its pulleys.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of a belt to be laced and a front elevation of the device attached to the belt. Fig. 2 is a plan view of one of the clasps of the device open. Fig. 3 is a transverse section on the line 3 3 of Fig. 1. Fig. 4 is a side elevation of a modified form of turnbuckle which may be used in connection with the device, and Fig. 5 is an edge view of the turnbuckle shown in Fig. 4.

In the construction of the device four clasps A are employed. These clasps are used in pairs, and a pair of clasps is employed near each end of the belt C to be laced. The clasps are made as shown in Fig. 2, and consist of two members 10 and 11, having offsets 12 at the central portion of their outer longitudinal edges, the said offsets being provided with knuckles, and the knuckles when brought together, in connection with a pintle, constitute a hinge 13. The two members 10 and 11 are adapted to fold one upon the other, and their inner faces have projections or roughened surfaces 14 produced thereon, so that the members of the clasps will not slip when a belt is held between them. Each member adjacent to its hinged longitudinal side has ordinarily two openings or apertures 15 made therein, and bolts 16 are passed through corresponding apertures of the two members when folded one over the other, and the bolts are provided with thumb-nuts 17 or their equivalents.

At or about the central portion of the front member 10 of each clasp a knob 18 is formed to facilitate the placing of the clasps upon a belt, as shown in Figs. 1 and 3. One clasp of each pair has a brace-bar 19 pivoted to its outer face near its lower end, and this brace-bar is provided with teeth 20 in one of its longitudinal edges, and a lug 21 is formed upon the opposite clamp of a pair adapted to be received between the teeth of the brace-bar, as shown in Fig. 1.

The back and front of each clasp is provided with a projection or extension 22 at the outer side of the end that faces the edge of the belt near which the clasps may be placed. Openings $22^a$ are made in each extension, and the corresponding projections or extensions 22 of the two pairs of clasps are connected by turnbuckles B and bolts 23 and 24. The bolts 23 at the ends removed from the turnbuckles are provided with lugs $a$ at both sides adapted to enter the openings $22^a$ of one pair of clasps when their members are made to grasp a belt. The bolts 24 have similarly-placed lugs $a'$, which enter the openings $22^a$ in the extensions of the second pair of clasps when their members are made to grasp a belt; but if in practice it is found desirable the lugs may be omitted and pins be employed in their stead.

In Fig. 1 the bow-sections $24^a$ of the turnbuckles B are in one piece, but in Figs. 4 and 5 the bow or body sections of the turnbuckles are illustrated as being constructed in two sections $b$ and $b'$, the two sections being connected by sleeves 25 and set-screws 26, carried by the sleeves, so that the bow or body sections of the turnbuckles may be elongated or may be contracted, as occasion may demand.

In operation a clasp is made to grasp each side edge of the belt near each end and is held in clamping engagement with the belt by tightening up the thumb-nuts 17, the edges of the belt resting against the bolts 16, as shown particularly in Fig. 3. The brace-bars are then carried across the belt from one clasp of a pair to the other, and these brace-bars are intended to prevent the belt from crumpling.

Near the edges of the belt the usual apertures 27 are made to receive the whang leather or laces 28, and the ends of the belt are brought together as closely as may be desired by manipulating the turnbuckles B.

Having thus described my invention, I claim as new and desire to secure by Letters Patent—

1. A belt-tightener, comprising clasps arranged in pairs, and each consisting of two members hinged together and provided with fastening devices, a bolt engaging the members of each clasp, and turnbuckles engaging the bolts of corresponding clasps, substantially as described.

2. A belt-tightener, comprising clasps arranged in pairs, a bolt secured to one end of each clasp, turnbuckles engaging the bolts of corresponding clasps, a toothed brace-bar hinged to one clasp of each pair, and a lug on the opposite clasp of each pair and with which the teeth of the brace-bar engages, substantially as described.

3. A belt-tightener, comprising clasps arranged in pairs and each consisting of two members hinged together and provided with fastening devices, a bolt engaging the members of each clasp, turnbuckles engaging the bolts of corresponding clasps, a toothed brace-bar hinged to one member of each clasp, and a lug on one member of the opposite clasp, and with which the teeth of the brace-bar engage, substantially as described.

4. A belt-tightener, comprising clasps arranged in pairs and each consisting of two members hinged together and provided with fastening devices, the members of each clasp being provided at one end with alining apertures, bolts provided with oppositely-projecting lugs entering the said apertures, turnbuckles engaging the bolts of corresponding clasps, and means for connecting the clasps of each pair together, substantially as described.

5. A belt-tightener consisting of pairs of clasps, each clasp consisting of two members having a hinged connection, their inner faces being roughened, and tightening-bolts adapted to be passed through the two members, for the purpose of drawing them together, and a tension device connecting corresponding clasps of each pair, a brace-bar carried by a clasp of each pair, and keepers located on the opposite clasp of each pair, the brace-bar having recesses for the reception of the said keeper, as and for the purpose specified.

6. A belt-tightener consisting of clasps arranged in pairs, each clasp comprising two hinge-connected members and tightening devices passed through both members, and turnbuckles connecting corresponding clasps of each pair, the body portion of said turnbuckles being in adjustable sections, as and for the purpose specified.

7. A belt-tightener, consisting of clasps arranged in pairs, and each consisting of two members hinged together and provided with fastening devices, the members of each clasp being provided at one end with alining apertures, bolts provided with oppositely-projecting lugs entering the said apertures, turnbuckles engaging the bolts of corresponding clasps, and a toothed bar hinged to one clasp of each pair and engaging a lug on the other clasp of the pair, substantially as described.

SOLOMON R. FORBESS.

Witnesses:
J. C. GEORGE,
S. A. FORBESS.